(12) United States Patent
Jiang et al.

(10) Patent No.: US 12,396,034 B2
(45) Date of Patent: Aug. 19, 2025

(54) INFORMATION TRANSMISSION METHOD AND DEVICE

(71) Applicant: VIVO MOBILE COMMUNICATION CO., LTD., Dongguan (CN)

(72) Inventors: Lei Jiang, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 376 days.

(21) Appl. No.: 17/970,552

(22) Filed: Oct. 20, 2022

(65) Prior Publication Data

US 2023/0041752 A1 Feb. 9, 2023

Related U.S. Application Data

(63) Continuation of application No. PCT/CN2021/088166, filed on Apr. 19, 2021.

(30) Foreign Application Priority Data

Apr. 21, 2020 (CN) .......................... 202010319314.3

(51) Int. Cl.
*H04W 74/0816* (2024.01)
*H04W 74/00* (2009.01)

(52) U.S. Cl.
CPC ..... *H04W 74/0816* (2013.01); *H04W 74/002* (2013.01)

(58) Field of Classification Search
CPC ........... H04W 74/0816; H04W 74/002; H04W 76/11; H04W 16/14
See application file for complete search history.

(56) References Cited

U.S. PATENT DOCUMENTS

| | | | |
|---|---|---|---|
| 2009/0109938 A1* | 4/2009 | Singh | H04L 12/4035 370/337 |
| 2012/0082040 A1* | 4/2012 | Gong | H04L 5/0062 370/252 |
| 2016/0227571 A1 | 8/2016 | Baek et al. | |
| 2017/0208627 A1* | 7/2017 | You | H04W 74/0816 |
| 2017/0215200 A1* | 7/2017 | Mallik | H04W 72/1273 |
| 2017/0273111 A1* | 9/2017 | Wong | H04W 74/0816 |

(Continued)

FOREIGN PATENT DOCUMENTS

| | | |
|---|---|---|
| CN | 102547917 A | 7/2012 |
| CN | 105657849 A | 6/2016 |

(Continued)

OTHER PUBLICATIONS

First Office Action issued in related Chinese Application No. 202010319314.3, mailed Dec. 28, 2023, 8 pages.

(Continued)

*Primary Examiner* — Ayaz R Sheikh
*Assistant Examiner* — Mang Boi Thawng
(74) *Attorney, Agent, or Firm* — IPX PLLC (57) ABSTRACT

An information transmission method and a device are provided. The method is performed by an initiating node and includes: sending request to send Request To Send (RTS) information, where the RTS information includes identifier information of a responding node; and receiving confirm to send Confirm To Send (CTS) information from the responding node.

18 Claims, 4 Drawing Sheets

200

Send RTS information, where the RTS information includes identifier information of a responding node ~S202

Receive CTS information from a responding node ~S204

(56) References Cited

U.S. PATENT DOCUMENTS

| | | | |
|---|---|---|---|
| 2018/0077725 A1* | 3/2018 | Sun | H04W 28/26 |
| 2019/0306882 A1* | 10/2019 | Wee | H04W 72/20 |
| 2019/0306920 A1 | 10/2019 | Son et al. | |
| 2020/0100326 A1* | 3/2020 | Bendlin | H04W 88/06 |
| 2021/0345409 A1* | 11/2021 | Wagner | H04W 74/0816 |
| 2023/0232456 A1* | 7/2023 | Hedayat | H04L 5/0082 |
| | | | 370/329 |

FOREIGN PATENT DOCUMENTS

| | | |
|---|---|---|
| CN | 107113884 A | 8/2017 |
| CN | 108476527 A | 8/2018 |
| CN | 108513319 A | 9/2018 |
| CN | 109644405 A | 4/2019 |
| CN | 109691218 A | 4/2019 |
| CN | 109792753 A | 5/2019 |
| CN | 110832895 A | 2/2020 |
| WO | 2016167431 A1 | 10/2016 |

OTHER PUBLICATIONS

Nokia, Nokia Shanghai Bell, "NRU Channel Access Summary_RAN1 95", GPP tsg_ran\wg1_rl1, R1-1813994, Nov. 2018, 22 pages.

Ntt Docomo, Inc., "Channel access procedures for NR-U_final" 3GPP tsg_ran\wg1_rl1, R1-1904949, Apr. 2019, 4 pages.

Second Office Action issued in related Chinese Application No. 202010319314.3, mailed Jul. 31, 2024, 8 pages.

International Search Report issued in corresponding International Application No. PCT/CN2021/088166, mailed Jul. 19, 2021, 4 pages.

Samsung, "Hidden Node Issue in Multi-beam Operation on NR Unlicensed Spectrums", R1-1706112, 3GPP TSG-RAN WG1 Meeting #88bis, Mar. 2017.

* cited by examiner

Send RTS information, where the RTS information includes identifier information of a responding node ~S202

Receive CTS information from a responding node ~S204

INFORMATION TRANSMISSION METHOD AND DEVICE

CROSS-REFERENCE TO RELATED APPLICATIONS

This application is a continuation of International Application No. PCT/CN2021/088166, filed on Apr. 19, 2021, which claims priority to Chinese Patent Application No. 202010319314.3, filed on Apr. 21, 2020. The entire contents of each of the above-identified applications are expressly incorporated herein by reference.

TECHNICAL FIELD

Embodiments of the present disclosure relate to the field of communications, and in particular, to an information transmission method and a device.

BACKGROUND

As an important application scenario in the 5th-Generation (5G) field, the fifth-generation mobile communication technology, that is, new radio (New Radio, NR), can use a shared spectrum (for example, an unlicensed band) to transmit data. An unlicensed band is shared by multiple technologies (RATs). Therefore, usage of an unlicensed band must comply with some rules, such as Listen Before Talk (LBT) and Maximum Channel Occupancy Time (MCOT), to ensure that all communication devices can use this resource fairly.

Figure 1:
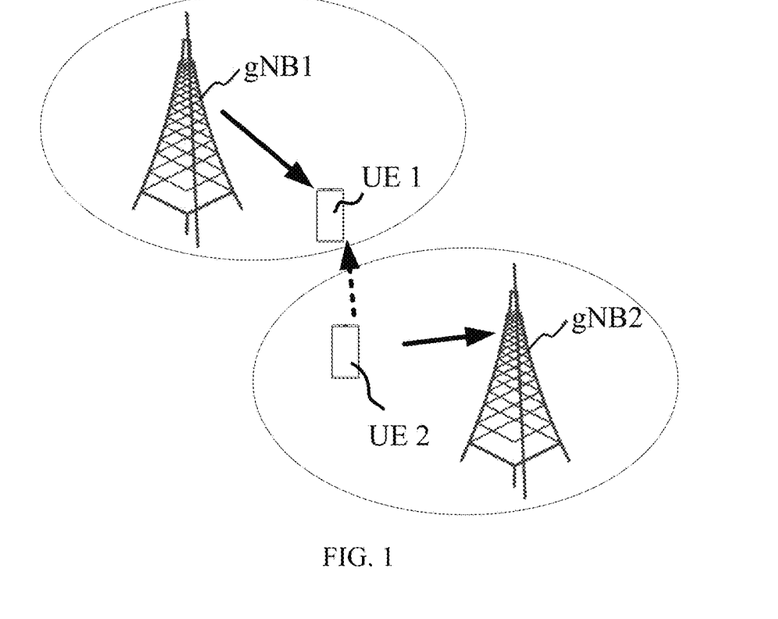
FIG. 1 is a schematic diagram of a hidden node in the prior art.

The LBT mechanism can solve some channel interference problems. However, since LBT is performed by an initiating node (Initiating Device), LBT cannot solve the problem of interference from a hidden node of a responding node (Responding Device). As shown in FIG. 1, gNB1 performs LBT before sending data and detects that a channel is idle. Therefore, gNB1 sends data to UE1, and UE1 receives the data. In this case, if UE2 needs to send data, UE2 performs LBT. Because gNB1 is far away from UE2 and UE1 is in a receiving state, UE2 detects that the channel is idle, and UE2 starts to send data. However, since UE2 is close to UE1, UE1 can receive data sent by UE2. In this case, UE2 can be called a hidden node of UE1, and UE1 is interfered by the hidden node (UE2) when receiving data from gNB1.

SUMMARY

In a first aspect, an information transmission method is provided, the method is performed by an initiating node, and the method includes: sending request to send RTS information, where the RTS information includes identifier information of a responding node; and receiving confirm to send CTS information from the responding node.

In a second aspect, an information transmission method is provided, the method is performed by a responding node, and the method includes: receiving RTS information from an initiating node; and if the RTS information includes identifier information of a responding node, sending CTS information.

In a third aspect, a communication device is provided, and the communication device includes: a sending module configured to send RTS information, where the RTS information includes identifier information of a responding node; and a receiving module configured to receive CTS information from the responding node.

In a fourth aspect, a communication device is provided, and the communication device includes: a receiving module configured to receive RTS information from an initiating node; and a sending module configured to send CTS information if the RTS information includes identifier information of the communication device.

In a fifth aspect, a communication device is provided, the communication device includes a processor, a memory, and an instruction or a program stored in the memory and executable on the processor, where when the processor executes the instruction or program, the information transmission method in either of the first aspect and the second aspect is implemented.

In a sixth aspect, a readable storage medium is provided, storing an instruction or a program, where when a processor executes the instruction or program, the information transmission method in either of the first aspect and the second aspect is implemented.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION

The following describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. "And/or" in the various embodiments of this specification may mean at least one of the former item and the latter item.

It should be understood that the technical solutions in the embodiments of the present disclosure may be applied to various communication systems, such as a Long Term Evolution (LTE) system, a LTE Frequency Division Duplex (FDD) system, LTE Time Division Duplex (TDD), a Universal Mobile Telecommunication System (UMTS) or a Worldwide Interoperability for Microwave Access (WiMAX) communication system, a 5G system, a New Radio (NR) system, or a subsequent evolved communication system.

In the embodiments of the present disclosure, a terminal device may include but is not limited to a Mobile Station (MS), a mobile terminal, a mobile telephone, User Equipment (UE), a handset, portable equipment, a vehicle, and the like. The terminal device may communicate with one or more core networks by using a Radio Access Network (RAN). For example, the terminal device may be a mobile telephone (or referred to as a "cellular" telephone), or a computer having a wireless communication function; or the terminal device may be a portable, pocket-sized, handheld, computer built-in, or in-vehicle mobile apparatus.

In the embodiments of the present disclosure, a network device is an apparatus that is deployed in a radio access network and that is configured to provide a wireless communication function for the terminal device. The network device may be a base station, and the base station may include various types of macro base stations, micro base stations, relay stations, or access points. In systems that use different radio access technologies, devices that have a base station function may have different names. For example, the device is called an evolved NodeB (Evolved NodeB, eNB or eNodeB) in an LTE network, is called a Node B in a 3rd generation (3G) network, or is called a next-generation NodeB (gNB) in a 5G system, or a network device in a subsequent evolved communications system, but the use of the words does not constitute a restriction.

Figure 2:
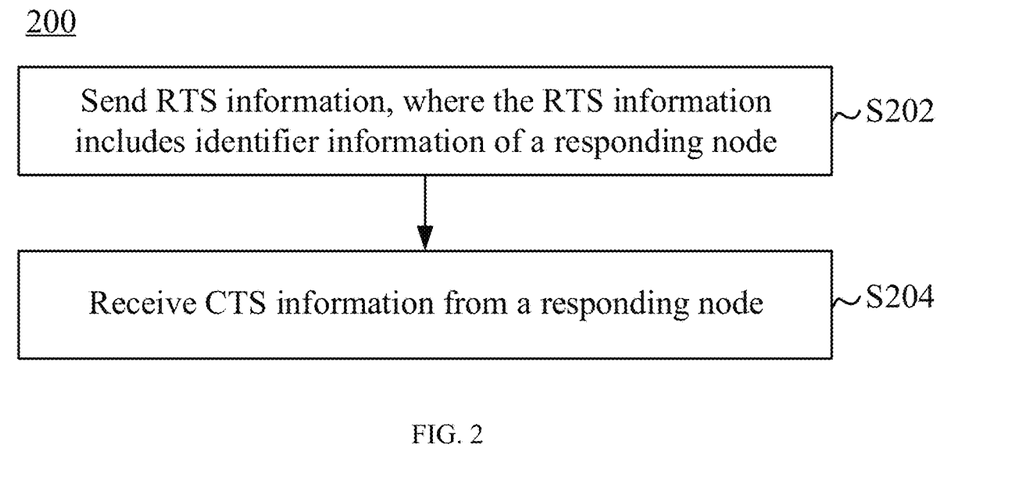
FIG. 2 is a schematic flowchart of an information transmission method according to an embodiment of the present disclosure.

As shown in FIG. 2, an embodiment of the present disclosure provides an information transmission method 200. The method can be executed by an initiating node, that is, the method can be executed by software or hardware installed in the initiating node. The method includes the following steps:

S202: Send Request To Send (RTS) information, where the RTS information includes identifier information of a responding node.

In this embodiment of the present disclosure, the initiating node may be a terminal device or a network device. Before sending data through a shared spectrum, the initiating node can send RTS information, where the RTS information carries a Network Allocation Vector (NAV) value or a channel occupancy time and the identifier information of the responding node (for example, an address of the responding node). The NAV value or channel occupancy time can be used to indicate how long the initiating node occupies the channel. In this way, all other nodes (that is, nodes other than the responding node) that receive the RTS information do not attempt to perform data transmission in the NAV or channel occupancy time.

The shared spectrum includes an intra-operator spectrum shared between Radio Access Technologies (RATs), or a spectrum shared between operators, and may also be an unlicensed band.

S204: Receive Confirm To Send (CTS) information from the responding node.

In this embodiment, the responding node may reply with the CTS information after receiving the RTS information, and the CTS information carries a NAV value or a channel occupancy time and identifier information of the initiating node (for example, an address of the initiating node). In this way, all other nodes (that is, nodes other than the initiating node) that receive the CTS information do not attempt to perform transmission in the NAV or channel occupancy time, thus avoiding the problem of interference from a hidden node around the responding node.

When the information transmission method provided by the embodiments of the present disclosure is applied to the scenario shown in FIG. 1, the process is as follows: gNB1 sends RTS information, where the RTS information includes a NAV value or a channel occupancy time and identifier information of UE1; and UE1 sends CTS information after receiving the RTS information, where the CTS information includes a NAV value or a channel occupancy time and identifier information of gNB1. In this case, UE2 can also receive the CTS information sent by UE1. In this way, UE2 does not attempt to perform transmission within the NAV or channel occupancy time, and thus will not cause interference to reception of UE1.

In the information transmission method provided by the embodiments of the present disclosure, the transmission mechanism of RTS/CTS can be introduced in NR, the initiating node may send RTS information, where the RTS information includes the identifier information of the responding node, and receive CTS information from the responding node, to complete the RTS/CTS handshake for transmission on the shared spectrum. Nodes that have not completed the RTS/CTS handshake do not attempt to perform transmission on the shared spectrum, thus avoiding the interference from the hidden node around the responding node and improving the communication efficiency.

In order to transmit RTS information/CTS information, the information transmission method will be described in detail in three embodiments below.

Embodiment 1

In some embodiments, the RTS information/CTS information in this embodiment may be carried in a Physical Downlink Control CHannel (PDCCH)/Physical Uplink Control Channel (PUCCH).

In example 1, for downlink transmission, that is, in a case that the initiating node is a network device and the responding node is a terminal device, the RTS information is sent through a first PDCCH; and the CTS information is received through a first PUCCH.

In example 2, for uplink transmission, that is, in a case that the initiating node is a terminal device and the responding node is a network device, the RTS information is sent through a second PUCCH; and the CTS information is received through a second PDCCH.

It can be understood that there is no conflict between the example 1 and the example 2, that is, the example 1 and the example 2 can be implemented simultaneously.

In some embodiments, the first PDCCH may be scrambled by a first Radio Network Temporary Identifier (RNTI), and the first RNTI is used to indicate that the first PDCCH carries the RTS information. In this way, the responding node such as the terminal device can distinguish whether received information is RTS information.

In some embodiments, the second PDCCH may be scrambled by a second RNTI, and the second RNTI is used to indicate that the second PDCCH carries the CTS information. In this way, the responding node such as the terminal device can distinguish whether received information is CTS information.

In some embodiments, both the first PDCCH and the second PDCCH may be scrambled by a third RNTI, where the first PDCCH and the second PDCCH in this example are the same PDCCH, and the third RNTI is used to indicate that the same PDCCH carries RTS information or CTS information (that is, distinguish from information other than RTS information and CTS information). In some embodiments, content carried by the same PDCCH can further distinguish RTS information from CTS information.

For example, first Downlink Control Information (DCI) carried by the same PDCCH carries first indication information, and the first indication information is used to indicate that the same PDCCH carries the RTS information or the CTS information.

The first indication information may be indicated by a newly defined indication field in the first DCI, or the first indication information is determined based on specific values or a combination of specific values of multiple fields (for example, multiple different fields) in the first DCI.

In some embodiments, in the example 1 and the example 2, the first PDCCH and the second PDCCH carry DCI in a first format, and the DCI in the first format is exclusively used for sending the RTS information and/or the CTS information.

This example can be implemented by introducing a new DCI format. The DCI format (that is, the DCI in the first format) is specially used to carry RTS information and/or CTS information. After receiving the DCI in the first format, the terminal device or network device can determine whether information is RTS information or CTS information according to content carried.

In some embodiments, for the first PDCCH and the second PDCCH in example 1 and example 2, whether the existing DCI carries RTS information/CTS information may be explicitly or implicitly indicated in the DCI. For example, whether the DCI carries RTS information/CTS information can be explicitly indicated by adding bits; or whether the DCI carries RTS information/CTS information can be implicitly indicated through specific values of different fields in the DCI or a combination of specific values.

In some embodiments, for example, the second DCI carried by the first PDCCH in example 1 carries second indication information, and the second indication information is used to indicate that the first PDCCH carries RTS information; and/or the third DCI carried by the second PDCCH in example 2 carries third indication information, and the third indication information is used to indicate that the second PDCCH carries CTS information.

The second indication information may be indicated by a newly defined indication field in the second DCI, or the second indication information is determined based on specific values or a combination of specific values of multiple fields in the second DCI; and/or the third indication information is indicated by a newly defined indication field in the third DCI, or the third indication information is determined based on specific values or a combination of specific values of multiple fields in the third DCI.

In some embodiments, for the first PUCCH and the second PUCCH in example 1 and example 2, a new PUCCH format can be added specially to transmit RTS information/ CTS information. In this way, the network device (for example, gNB) can determine, according to content carried in the UCI, whether received information is RTS information or CTS information. In addition, an indication field may also be added to the UCI to distinguish whether the UCI carries the RTS information or the CTS information.

Further, for downlink transmission, CTS information can also be transmitted through a channel similar to the PDCCH, that is, RTS information/CTS information is transmitted through the same type of channel, and the same type of channel mentioned herein can use the same channel format. The first channel for transmitting RTS information/CTS information can be scrambled by the same RNTI, and the information carried by the first channel can be used to distinguish whether information is RTS information or CTS information. Certainly, the first channel for transmitting RTS information/CTS information can also be scrambled by different RNTIs such as RTS-RNTI and CTS-RNTI for distinguishing. For uplink transmission, CTS information can also be transmitted through a channel similar to the PUCCH, that is, both RTS information and CTS information are transmitted through a channel (hereinafter referred to as the second channel) similar to the PUCCH. Information carried by the second channel distinguishes the RTS information from the CTS information.

In some embodiments, in example 3, for downlink transmission, that is, when the initiating node is a network device and the responding node is a terminal device, the RTS information and the CTS information are transmitted through a first channel, and a channel format of the first channel can be the same as the channel format of the PDCCH.

In some embodiments, in example 4, for uplink transmission, that is, when the initiating node is a terminal device and the responding node is a network device, the RTS information and the CTS information are transmitted through the second channel, and a channel format of the second channel may be the same as the channel format of the PUCCH.

In some embodiments, in a sidelink scenario, for example, when the initiating node and the responding node are both terminal devices, the RTS information is sent through a Physical Sidelink Control CHannel (PSCCH); and the CTS information is received through the PSCCH, and the sidelink terminal device can distinguish the RTS information from the CTS information according to information carried by the PSCCH.

Embodiment 2

In embodiment 2, RTS/CTS includes a preamble or sequence (a preamble and a preamble sequence are collectively referred to as a preamble sequence below) and a Media Access Control (MAC) Control Element (CE)/MAC Protocol Data Unit (PDU), and the RTS information/CTS information is identified according to one of methods 1 to 3 described below.

For example, in embodiment 200, the RTS information is sent through a first message, and the first message includes a MAC CE or a MAC PDU; and/or the CTS information is received through a second message, and the second message includes a MAC CE or a MAC PDU.

The first message further includes a first preamble sequence, and the first preamble sequence is used to indicate that the first message carries the RTS information; and/or the second message further includes a second preamble sequence, and the second preamble sequence is used to indicate that the second message carries the CTS information.

Method 1

It is determined, based on a format of the first preamble sequence, that the first message carries the RTS information, where the format of the first preamble sequence is predefined or configured; and/or it is determined, based on a format of the second preamble sequence, that the second message carries the CTS information, where the format of the second preamble sequence is predefined or configured.

In method 1, the predefined or configured preamble sequence can be used to identify whether the MAC CE or the MAC PDU carries the RTS information or the CTS information. For example, the preamble sequence includes two (or more than two) orthogonal or quasi-orthogonal sequence formats, where one (or one group of) sequence identifies that the transmitted MAC CE/MAC PDU is RTS information, and the other (or the other group of) sequence identifies that the transmitted MAC CE/MAC PDU is CTS information.

In some embodiments, the preamble sequence can reuse a Primary Synchronization Signal (PSS) or Secondary Synchronization Signal (SSS) sequence in NR, and a transmission position of the preamble sequence can be one or more specific locations in frequency domain of a non-sync raster, to avoid interference with initial access and simplify detection of RTS information/CTS information by the node.

Method 2

It is determined, according to a time-frequency resource position of the first preamble sequence, that the first message carries the RTS information; and/or it is determined, according to a time-frequency resource position of the second preamble sequence, that the second message carries the CTS information.

In method 2, the RTS information/CTS information can be identified by the time domain and/or frequency domain position of the predefined or configured preamble sequence. For example, the preamble sequence can reuse the PSS or SSS sequence in NR, the PSS in position 1 of the non-sync raster indicates that the MAC CE or MAC PDU carries RTS information, and the PSS in position 2 of the non-sync raster indicates that the MAC CE or MAC PDU carries CTS information.

Method 3

It is determined, according to load information of a fixed position of the first message or demodulation reference signal DM-RS information of the first message, that the first message carries the RTS information; and/or it is determined, according to load information of a fixed position of the second message or DM-RS information of the second message, that the second message carries the CTS information.

In method 3, load information of a fixed position of the MAC CE/MAC PDU or DeModulation Reference Signals (DM-RS) information may identify whether the MAC CE or the MAC PDU carries RTS information or CTS information. For example, the MAC CE/MAC PDU reuses the structure of a Physical Broadcasting Channel (PBCH), and time domain timing information or PBCH DM-RS information in the PBCH identifies RTS information/CTS information.

Embodiment 3

In embodiment 200, the RTS message and the CTS message are transmitted through a third channel; where the third channel is detectable by the initiating node and the responding node.

In some embodiments, a time domain location of the RTS information is predefined; and/or a time domain location of the CTS information is predefined.

In this embodiment, the NR communication system has a common RTS/CTS channel, which can be read by all nodes (the network device and the terminal device) in the system, thereby solving the hidden node problem.

To enable the network device and the terminal device to send or receive RTS information/CTS information and reduce unnecessary signal detection by the network device and the terminal device, the network device and the terminal device in the system can be synchronized, and a time domain location for sending the RTS information can be preset or configured. In this way, the network device and the terminal device only need to detect the RTS information in a preset or configured position. After detecting the RTS information, if the network device or the terminal device is the target node indicated by the RTS information, the CTS information is sent after a preset time delay. If the network device or the terminal device has not detected the RTS information, the CTS information is monitored after a preset time delay. Other network devices and terminal devices (which are not nodes that send RTS information/CTS information) that detect RTS information or CTS information do not perform transmission in the channel occupancy time indicated by the RTS information or CTS information.

The information transmission method according to the embodiments of the present disclosure is described above in detail with reference to FIG. 2. An information transmission method according to another embodiment of the present disclosure is described in detail below with reference to FIG. 3. It may be understood that descriptions on the responding node side is the same as those on the initiating node side in the method shown in FIG. 1. To avoid repetition, related descriptions are appropriately omitted.

Figure 3:
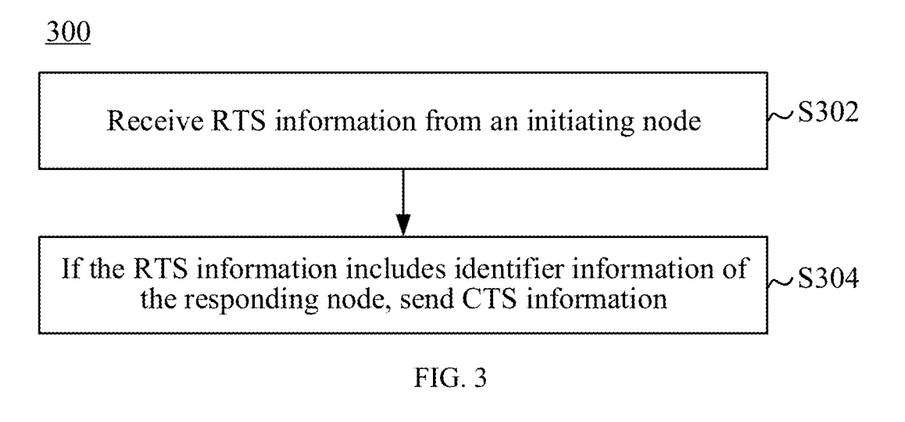
FIG. 3 is a schematic flowchart of an information transmission method according to another embodiment of the present disclosure.

FIG. 3 is a schematic flowchart of an implementation of an information transmission method according to an embodiment of the present disclosure, where the method can be applied to the responding node side. As shown in FIG. 3, the method 300 includes the following steps.

S302: Receive RTS information from an initiating node.

S304: If the RTS information includes identifier information of the responding node, send CTS information.

In the information transmission method provided by the embodiments of the present disclosure, the transmission mechanism of RTS/CTS can be introduced in NR, the initiating node may send RTS information, where the RTS information includes the identifier information of the responding node, and receive CTS information from the responding node, to complete the RTS/CTS handshake for transmission on the shared spectrum. Nodes that have not completed the RTS/CTS handshake do not attempt to perform transmission, thus avoiding the interference from the hidden node around the responding node and improving the communication efficiency.

For example, as an embodiment, in a case that the initiating node is a network device and the responding node is a terminal device, the RTS information is received through a first PDCCH; and the CTS information is sent through a first PUCCH; and/or in a case that the initiating node is a terminal device and the responding node is a network device, the RTS information is received through a second PUCCH; and the CTS information is sent through a second PDCCH.

For example, as an embodiment, the first PDCCH is scrambled by a first RNTI, and the first RNTI is used to indicate that the first PDCCH carries the RTS information; and/or the second PDCCH is scrambled by a second RNTI, and the second RNTI is used to indicate that the second PDCCH carries the CTS information.

For example, as an embodiment, both the first PDCCH and the second PDCCH are scrambled by a third RNTI, the first PDCCH and the second PDCCH are the same PDCCH, and the third RNTI is used to indicate that the same PDCCH carries the RTS information or the CTS information.

For example, as an embodiment, first DCI carried by the same PDCCH carries first indication information, and the first indication information is used to indicate that the same PDCCH carries the RTS information or the CTS information.

For example, as an embodiment, the first indication information is indicated by a newly defined indication field in the first DCI, or the first indication information is determined based on specific values or a combination of specific values of multiple fields in the first DCI.

For example, as an embodiment, the first PDCCH and the second PDCCH carry DCI in a first format, and the DCI in the first format is exclusively used for sending the RTS information and/or the CTS information.

For example, as an embodiment, second DCI carried by the first PDCCH carries second indication information, and the second indication information is used to indicate that the first PDCCH carries the RTS information; and/or third DCI carried by the second PDCCH carries third indication information, and the third indication information is used to indicate that the second PDCCH carries the CTS information.

For example, as an embodiment, the second indication information is indicated by a newly defined indication field in the second DCI, or the second indication information is determined based on specific values or a combination of specific values of multiple fields in the second DCI; and/or the third indication information is indicated by a newly defined indication field in the third DCI, or the third indication information is determined based on specific values or a combination of specific values of multiple fields in the third DCI.

For example, as an embodiment, in a case that the initiating node is a network device and the responding node is a terminal device, the RTS information and the CTS information are transmitted through a first channel; and/or in a case that the initiating node is a terminal device and the responding node is a network device, the RTS information and the CTS information are transmitted through a second channel.

For example, as an embodiment, in a case that both the initiating node and the responding node are terminal devices, the RTS information is received through a PSCCH; and the CTS information is sent through the PSCCH.

For example, as an embodiment, the RTS information is received through a first message, and the first message includes a MAC CE or a MAC PDU; and/or the CTS information is sent through a second message, and the second message includes a MAC CE or a MAC PDU.

For example, as an embodiment, the first message further includes a first preamble sequence, and the first preamble sequence is used to indicate that the first message carries the RTS information; and/or the second message further includes a second preamble sequence, and the second preamble sequence is used to indicate that the second message carries the CTS information.

For example, as an embodiment, it is determined, based on a format of the first preamble sequence, that the first message carries the RTS information, where the format of the first preamble sequence is predefined or configured; and/or it is determined, based on a format of the second preamble sequence, that the second message carries the CTS information, where the format of the second preamble sequence is predefined or configured.

For example, as an embodiment, the method further includes: determining, according to a time-frequency resource position of the first preamble sequence, that the first message carries the RTS information; and/or determining, according to a time-frequency resource position of the second preamble sequence, that the second message carries the CTS information.

For example, as an embodiment, the method further includes: determining, according to load information of a fixed position of the first message or DM-RS information of the first message, that the first message carries the RTS information; and/or determining, according to load information of a fixed position of the second message or DM-RS information of the second message, that the second message carries the CTS information.

For example, as an embodiment, the RTS message and the CTS message are transmitted through a third channel; where the third channel is detectable by the initiating node and the responding node.

For example, as an embodiment, a time domain location of the RTS information is predefined; and/or a time domain location of the CTS information is predefined.

The information transmission method according to the embodiments of the present disclosure is described in detail above with reference to FIG. 1 to FIG. 3. The communication device according to the embodiments of the present disclosure will be described in detail below with reference to FIG. 4.

Figure 4:
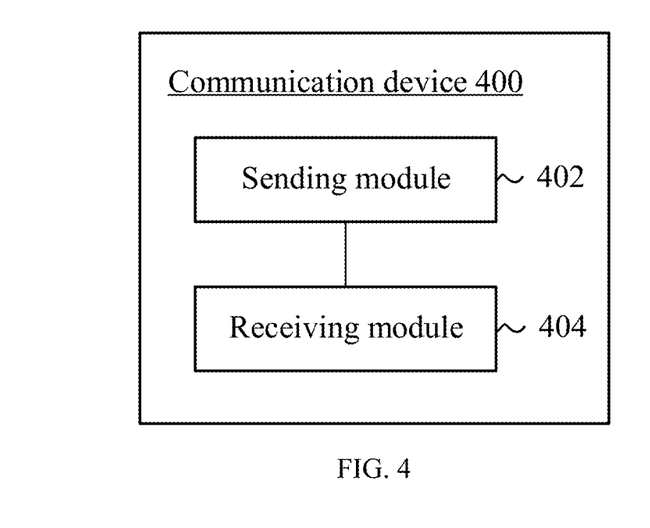
FIG. 4 is a schematic structural diagram of a communication device according to an embodiment of the present disclosure.

FIG. 4 is a schematic structural diagram of a communication device according to an embodiment of the present disclosure. The communication device corresponds to the originating node in each of the foregoing embodiments. As shown in FIG. 4, the communication device 400 includes the following modules:
- a sending module 402 configured to send RTS information, where the RTS information includes identifier information of a responding node; and
- a receiving module 404 configured to receive CTS information from the responding node.

In the embodiments of the present disclosure, the transmission mechanism of RTS/CTS can be introduced in NR, the initiating node may send RTS information, where the RTS information includes the identifier information of the responding node, and receive CTS information from the responding node, to complete the RTS/CTS handshake for transmission on the shared spectrum. Nodes that have not completed the RTS/CTS handshake do not attempt to perform transmission on the shared spectrum, thus avoiding the interference from the hidden node around the responding node and improving the communication efficiency.

For example, as an embodiment, in a case that the communication device 400 is a network device and the responding node is a terminal device, the RTS information is sent through a first PDCCH; and the CTS information is received through a first PUCCH; and/or in a case that the communications device 400 is a terminal device and the responding node is a network device, the RTS information is sent through a second PUCCH; and the CTS information is received through a second PDCCH.

For example, as an embodiment, the first PDCCH is scrambled by a first RNTI, and the first RNTI is used to indicate that the first PDCCH carries the RTS information; and/or the second PDCCH is scrambled by a second RNTI, and the second RNTI is used to indicate that the second PDCCH carries the CTS information.

For example, as an embodiment, both the first PDCCH and the second PDCCH are scrambled by a third RNTI, the first PDCCH and the second PDCCH are the same PDCCH, and the third RNTI is used to indicate that the same PDCCH carries the RTS information or the CTS information.

For example, as an embodiment, first DCI carried by the same PDCCH carries first indication information, and the first indication information is used to indicate that the same PDCCH carries the RTS information or the CTS information.

For example, as an embodiment, the first indication information is indicated by a newly defined indication field in the first DCI, or the first indication information is determined based on specific values or a combination of specific values of multiple fields in the first DCI.

For example, as an embodiment, the first PDCCH and the second PDCCH carry DCI in a first format, and the DCI in the first format is exclusively used for sending the RTS information and/or the CTS information.

For example, as an embodiment, second DCI carried by the first PDCCH carries second indication information, and the second indication information is used to indicate that the first PDCCH carries the RTS information; and/or third DCI carried by the second PDCCH carries third indication information, and the third indication information is used to indicate that the second PDCCH carries the CTS information.

For example, as an embodiment, the second indication information is indicated by a newly defined indication field in the second DCI, or the second indication information is determined based on specific values or a combination of specific values of multiple fields in the second DCI; and/or the third indication information is indicated by a newly defined indication field in the third DCI, or the third indication information is determined based on specific values or a combination of specific values of multiple fields in the third DCI.

For example, as an embodiment, in a case that the communication device 400 is a network device and the responding node is a terminal device, the RTS information and the CTS information are transmitted through a first channel; and/or in a case that the communication device 400 is a terminal device and the responding node is a network device, the RTS information and the CTS information are transmitted through a second channel.

For example, as an embodiment, in a case that both the communication device 400 and the responding node are terminal devices, the RTS information is sent through a PSCCH; and the CTS information is received through the PSCCH.

For example, as an embodiment, the RTS information is sent through a first message, and the first message includes a MAC CE or a MAC PDU; and/or the CTS information is received through a second message, and the second message includes a MAC CE or a MAC PDU.

For example, as an embodiment, the first message further includes a first preamble sequence, and the first preamble sequence is used to indicate that the first message carries the RTS information; and/or the second message further includes a second preamble sequence, and the second preamble sequence is used to indicate that the second message carries the CTS information.

For example, as an embodiment, the sending module 402 may be configured to determine, based on a format of the first preamble sequence, that the first message carries the RTS information, where the format of the first preamble sequence is predefined or configured; and/or the receiving module 404 may be configured to determine, based on a format of the second preamble sequence, that the second message carries the CTS information, where the format of the second preamble sequence is predefined or configured.

For example, as an embodiment, the sending module 402 may be configured to determine, according to a time-frequency resource position of the first preamble sequence, that the first message carries the RTS information; and/or the receiving module 404 may be configured to determine, according to a time-frequency resource position of the second preamble sequence, that the second message carries the CTS information.

For example, as an embodiment, the sending module 402 may be configured to determine, according to load information of a fixed position of the first message or DM-RS information of the first message, that the first message carries the RTS information; and/or the receiving module 404 may be configured to determine, according to load information of a fixed position of the second message or DM-RS information of the second message, that the second message carries the CTS information.

For example, as an embodiment, the RTS message and the CTS message are transmitted through a third channel; where the third channel is detectable by the communication device 400 and the responding node.

For example, as an embodiment, a time domain location of the RTS information is predefined; and/or a time domain location of the CTS information is predefined.

For the communication device 400 according to this embodiment of the present disclosure, refer to the procedure corresponding to the method 200 according to the corresponding embodiments of the present disclosure. Furthermore, each unit/module in the communication device 400 and the foregoing other operations and/or functions are used to implement corresponding procedure of the method 200, and the same or equivalent technical effects can be achieved. For brevity, details are not provided herein again.

Figure 5:
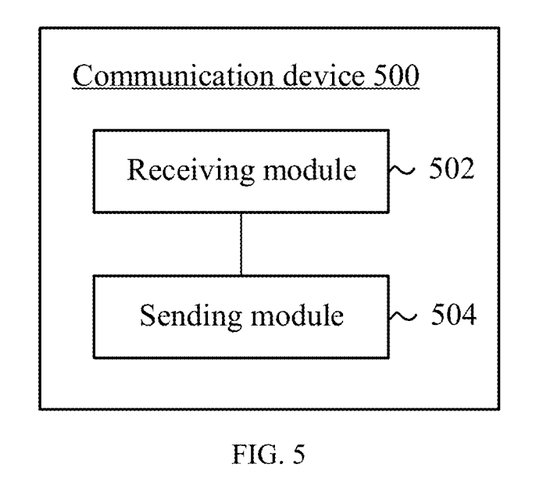
FIG. 5 is a schematic structural diagram of a communication device according to another embodiment of the present disclosure.

FIG. 5 is a schematic structural diagram of a communication device according to an embodiment of the present disclosure. The communication device corresponds to the response node in the foregoing embodiments. As shown in FIG. 5, the communication device 500 includes the following modules:

a receiving module 502 configured to receive RTS information from an initiating node; and a sending module 504 configured to: if the RTS information includes identifier information of the communication device 500, send CTS information.

In the embodiments of the present disclosure, the transmission mechanism of RTS/CTS can be introduced in NR, the initiating node may send RTS information, where the RTS information includes the identifier information of the responding node, and receive CTS information from the responding node, to complete the RTS/CTS handshake for transmission on the shared spectrum. Nodes that have not completed the RTS/CTS handshake do not attempt to perform transmission on the shared spectrum, thus avoiding the interference from the hidden node around the responding node and improving the communication efficiency.

For example, as an embodiment, in a case that the initiating node is a network device and the communication device 500 is a terminal device, the RTS information is received through a first physical PDCCH; and the CTS information is sent through a first PUCCH; and/or in a case that the initiating node is a terminal device and the communication device 500 is a network device, the RTS information is received through a second PUCCH; and the CTS information is sent through a second PDCCH.

For example, as an embodiment, the first PDCCH is scrambled by a first RNTI, and the first RNTI is used to indicate that the first PDCCH carries the RTS information; and/or the second PDCCH is scrambled by a second RNTI, and the second RNTI is used to indicate that the second PDCCH carries the CTS information.

For example, as an embodiment, both the first PDCCH and the second PDCCH are scrambled by a third RNTI, the first PDCCH and the second PDCCH are the same PDCCH, and the third RNTI is used to indicate that the same PDCCH carries the RTS information or the CTS information.

For example, as an embodiment, first DCI carried by the same PDCCH carries first indication information, and the first indication information is used to indicate that the same PDCCH carries the RTS information or the CTS information.

For example, as an embodiment, the first indication information is indicated by a newly defined indication field in the first DCI, or the first indication information is determined based on specific values or a combination of specific values of multiple fields in the first DCI.

For example, as an embodiment, the first PDCCH and the second PDCCH carry DCI in a first format, and the DCI in the first format is exclusively used for sending the RTS information and/or the CTS information.

For example, as an embodiment, second DCI carried by the first PDCCH carries second indication information, and the second indication information is used to indicate that the first PDCCH carries the RTS information; and/or third DCI carried by the second PDCCH carries third indication information, and the third indication information is used to indicate that the second PDCCH carries the CTS information.

For example, as an embodiment, the second indication information is indicated by a newly defined indication field in the second DCI, or the second indication information is determined based on specific values or a combination of specific values of multiple fields in the second DCI; and/or the third indication information is indicated by a newly defined indication field in the third DCI, or the third indication information is determined based on specific values or a combination of specific values of multiple fields in the third DCI.

For example, as an embodiment, in a case that the initiating node is a network device and the communication device 500 is a terminal device, the RTS information and the CTS information are transmitted through a first channel; and/or in a case that the initiating node is a terminal device and the communication device 500 is a network device, the RTS information and the CTS information are transmitted through a second channel.

For example, as an embodiment, in a case that the initiating node and the communication device 500 are both terminal devices, the RTS information is received through a PSCCH; and the CTS information is sent through the PSCCH.

For example, as an embodiment, the RTS information is received through a first message, and the first message includes a MAC CE or a MAC PDU; and/or the CTS information is sent through a second message, and the second message includes a MAC CE or a MAC PDU.

For example, as an embodiment, the first message further includes a first preamble sequence, and the first preamble sequence is used to indicate that the first message carries the RTS information; and/or the second message further includes a second preamble sequence, and the second preamble sequence is used to indicate that the second message carries the CTS information.

For example, as an embodiment, it is determined, based on a format of the first preamble sequence, that the first message carries the RTS information, where the format of the first preamble sequence is predefined or configured; and/or it is determined, based on a format of the second preamble sequence, that the second message carries the CTS information, where the format of the second preamble sequence is predefined or configured.

For example, as an embodiment, the receiving module 502 may be configured to determine, according to a time-frequency resource position of the first preamble sequence, that the first message carries the RTS information; and/or the sending module 504 may be configured to determine, according to a time-frequency resource position of the second preamble sequence, that the second message carries the CTS information.

For example, as an embodiment, the receiving module 502 may be configured to determine, according to load information of a fixed position of the first message or DM-RS information of the first message, that the first message carries the RTS information; and/or the sending module 504 may be configured to determine, according to load information of a fixed position of the second message or DM-RS information of the second message, that the second message carries the CTS information.

For example, as an embodiment, the RTS message and the CTS message are transmitted through a third channel; where the third channel is detectable by the initiating node and the communication device 500.

For example, as an embodiment, a time domain location of the RTS information is predefined; and/or a time domain location of the CTS information is predefined.

For the communication device 500 according to this embodiment of the present disclosure, refer to the procedure corresponding to the method 300 according to the corresponding embodiments of the present disclosure. Furthermore, each unit/module in the communication device 500 and the foregoing other operations and/or functions are used to implement corresponding procedure of the method 300, and the same or equivalent technical effects can be achieved. For brevity, details are not provided herein again.

The embodiments in this specification are described in a progressive manner. Each embodiment usually focuses on a difference from other embodiments. For a same or similar part of the embodiments, refer to each other. A device embodiment is described simply because the device embodiment is similar to the method embodiment. For related details, please refer to some description of the method embodiment.

When an indefinite or definite article (for example, "a", "an", or "the") is used when referring to a singular noun, the singular noun includes the plural of that noun unless specifically stated otherwise.

Furthermore, the terms "first," "second," and "third," etc. are used in the specification and claims to distinguish between similar channels or information, and these terms do not necessarily describe an order or temporal order. It should be understood that the terms so used are interchangeable under appropriate circumstances and that the embodiments of the present disclosure described herein are capable of operation in other orders than described or illustrated herein.

Figure 6:
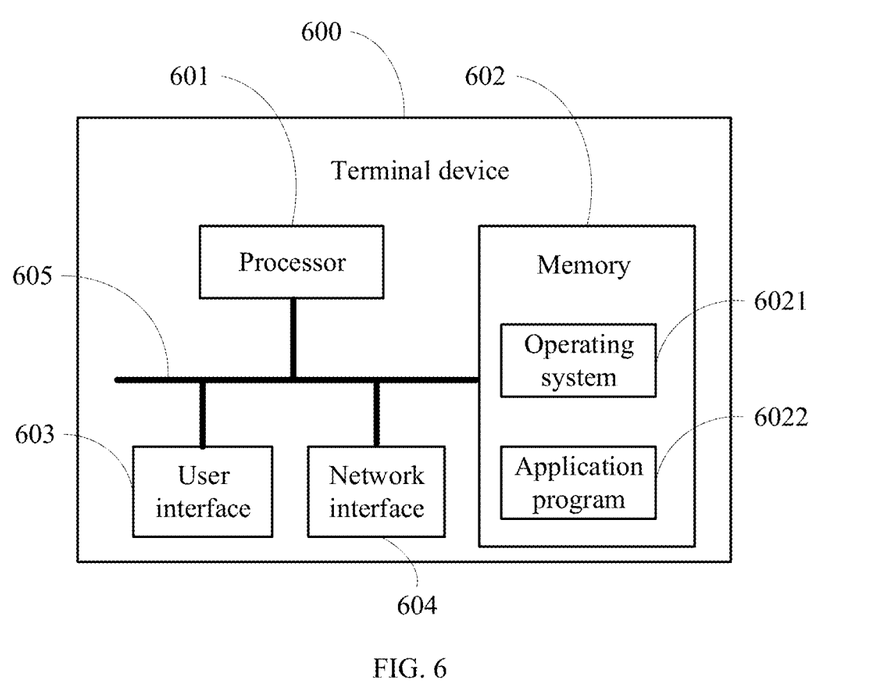
FIG. 6 is a schematic structural diagram of a terminal device according to an embodiment of the present disclosure.

FIG. 6 is a block diagram of a terminal device according to another embodiment of the present disclosure. As shown in FIG. 6, a terminal device 600 includes: at least one processor 601, a memory 602, at least one network interface 604, and a user interface 603. All components in the terminal device 600 are coupled together through a bus system 605. It can be understood that the bus system 605 is configured to implement connection and communication between these components. In addition to a data bus, the bus system 605 further includes a power bus, a control bus, and a status signal bus. However, for clear description, various buses are marked as the bus system 605 in FIG. 6.

The user interface 603 may include a display, a keyboard, or a clicking device (for example, a mouse or a trackball), a touch panel, or a touchscreen.

It may be understood that the memory 602 in this embodiment of the present disclosure may be a volatile memory or a non-volatile memory, or may include both a volatile memory and a non-volatile memory. The non-volatile memory is a Read-Only Memory (ROM), a Programmable ROM (PROM), an Erasable PROM (EPROM), an Electrically EPROM (EEPROM) or a flash memory. The volatile memory may be a Random Access Memory (RAM), used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a SynchLink DRAM (SLDRAM), and a Direct Rambus RAM (DRRAM). The memory 602 of the system and method described in the embodiments of the present disclosure is intended to include but is not limited to these and any other suitable type of memory.

In some implementation manners, the memory 602 stores the following element, an executable module or a data structure, or a subset thereof, or an extension set thereof: an operating system 6021 and an application program 6022.

The operating system 6021 includes various system programs, for example, a framework layer, a kernel library layer, and a driver layer, and is configured to implement various basic services and process a hardware-based task. The application program 6022 includes various application programs, for example, a media player and a browser, and is used to implement various application services. A program for implementing the method in this embodiment of the present disclosure may be included in the application program 6022.

In this embodiment of the present application, the terminal device 600 further includes an instruction or a program that is stored in the memory 602 and that can run on the processor 601, and when the instruction or program is executed by the processor 601, the steps of the method 200 are implemented.

The method disclosed in the foregoing embodiment of the present disclosure may be applied to the processor 601, or implemented by the processor 601. The processor 601 may be an integrated circuit chip having a signal processing capability. During implementation, each step of the foregoing method may be completed by using an integrated logic circuit of hardware in the processor 601 or an instruction in a form of software. The foregoing processor 601 may be a general-purpose processor, a Digital Signal Processor (DSP), an Application Specific Integrated Circuits (ASIC), a Field Programmable Gate Array (FPGA) or another programmable logic component, a discrete gate or a transistor logic component, or a discrete hardware component. The methods, steps, and logical block diagrams disclosed in the embodiments of the present disclosure may be implemented or executed. The general-purpose processor may be a microprocessor, or the processor may be any conventional processor or the like. The steps of the method disclosed with reference to the embodiments of the present disclosure may be directly performed by a hardware decoding processor, or may be performed by using a combination of hardware and software modules in a decoding processor. The software module may be located in a mature readable storage medium in this field such as a random access memory, a flash memory, a read-only memory, a programmable read-only memory or an electrically erasable programmable memory, or a register. The readable storage medium is located in the memory 602. The processor 601 reads information in the memory 602, and completes steps of the foregoing method in combination with hardware of the processor. In some embodiments, the readable storage medium stores an instruction or a program, and when the instruction or program is executed by the processor 601, the steps of the foregoing method embodiment 200 are performed.

It may be understood that the embodiments described in the embodiments of the present disclosure may be implemented by hardware, software, firmware, middleware, microcode, or a combination thereof. For implementation with hardware, a processing unit can be implemented in one or more ASIC, a DSP, a DSP Device (DSPD), a Programmable Logic Device (PLD), an FPGA, general processors, controllers, micro-controllers, microprocessors, and another electronic unit for implementing the functions of this application, or their combinations.

For software implementations, the techniques described in embodiments of the present disclosure may be implemented by modules (for example, processes or functions) that perform the functions described in the embodiments of the present disclosure. A software code may be stored in the memory and executed by the processor. The memory may be implemented in the processor or outside the processor.

The terminal device 600 can implement each process implemented by the terminal device in the foregoing embodiments, and the same or equivalent technical effect can be achieved. To avoid repetition, details are not described herein again.

Figure 7:
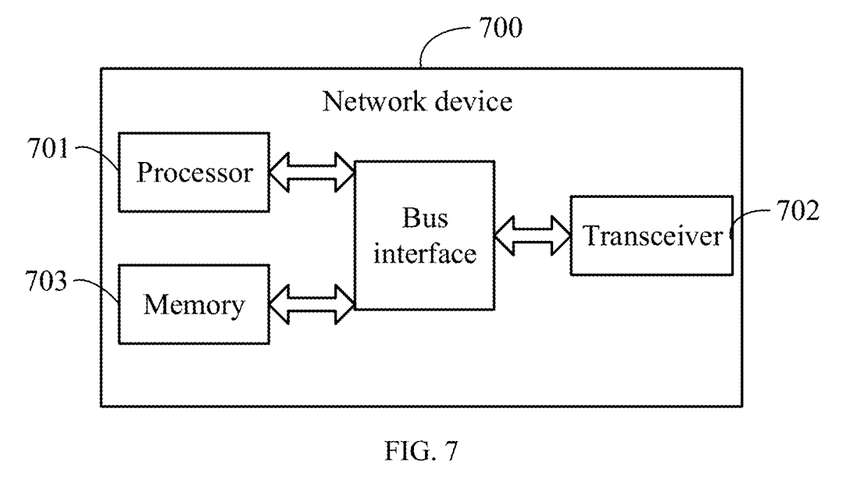
FIG. 7 is a schematic structural diagram of a network device according to an embodiment of the present disclosure.

Referring to FIG. 7, FIG. 7 is a structural diagram of a network device to which an embodiment of the present disclosure is applied. The network device can implement details of the embodiment of the method 300, and achieve a same effect. As shown in FIG. 7, a network device 700 includes a processor 701, a transceiver 702, a memory 703, and a bus interface.

In this embodiment of the present application, the network device 700 further includes: an instruction or a program stored in the memory 703 and executable on the processor 701. When the instruction or program is executed by the processor 701, the steps of the method 300 are implemented.

In FIG. 7, a bus architecture may include any quantity of interconnected buses and bridges, and is linked by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides interfaces. The transceiver 702 may be a plurality of elements, in other words, includes a transmitter and a receiver, and provides a unit configured to communicate with various other apparatuses on a transmission medium.

The processor 701 is responsible for managing the bus architecture and common processing, and the memory 703 may store data used when the processor 701 performs an operation.

The embodiments of the present disclosure further provide a readable storage medium. The readable storage medium stores an instruction or a program, and when a processor executes the instruction or program, the processes of any one of the foregoing method embodiment 200 and the foregoing method embodiment 300 are implemented and the same technical effect can be achieved. To avoid repetition, details are not described herein again. The readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical constraints in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of the present disclosure in essence or the parts that make contributions to the prior art can be embodied in the form of software products. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. An information transmission method, performed by an initiating node, comprising:
   sending Request To Send (RTS) information, wherein the RTS information comprises identifier information of a responding node; and
   receiving Confirm To Send (CTS) information from the responding node,
   wherein the RTS information and the CTS information are transmitted through a third channel;
   wherein the third channel is detectable by the initiating node and the responding node;
   wherein
   a time domain location of the RTS information is predefined; or
   a time domain location of the CTS information is predefined.

2. The method according to claim 1, wherein
   when the initiating node is a network device and the responding node is a terminal device, the RTS information is sent through a first Physical Downlink Control CHannel (PDCCH); and the CTS information is received through a first Physical Uplink Control CHannel (PUCCH); or
   when the initiating node is a terminal device and the responding node is a network device, the RTS information is sent through a second PUCCH, and the CTS information is received through a second PDCCH.

3. The method according to claim 2, wherein
   the first PDCCH is scrambled by a first Radio Network Temporary Identifier (RNTI), and the first RNTI is used to indicate that the first PDCCH carries the RTS information;
   the second PDCCH is scrambled by a second RNTI, and the second RNTI is used to indicate that the second PDCCH carries the CTS information; or
   both the first PDCCH and the second PDCCH are scrambled by a third RNTI, the first PDCCH and the second PDCCH are the same PDCCH, and the third RNTI is used to indicate that the same PDCCH carries the RTS information or the CTS information.

4. The method according to claim 3, wherein
   first Downlink Control Information (DCI) carried by the same PDCCH carries first indication information, and the first indication information is used to indicate that the same PDCCH carries the RTS information or the CTS information.

5. The method according to claim 4, wherein
   the first indication information is indicated by a newly defined indication field in the first DCI, or the first indication information is determined based on specific values or a combination of specific values of multiple fields in the first DCI.

6. The method according to claim 2, wherein
   when the initiating node is the terminal device and the responding node is the network device, the RTS information is sent through the second PUCCH; and the CTS information is received through the second PDCCH, the first PDCCH and the second PDCCH carry Downlink Control Information (DCI) in a first format, and the DCI in the first format is exclusively used for sending the RTS information or the CTS information;
   when the initiating node is the network device and the responding node is the terminal device, the RTS information is sent through the first PDCCH; and the CTS information is received through the first PUCCH, second Downlink Control Information (DCI) carried by the first PDCCH carries second indication information, and the second indication information is used to indicate that the first PDCCH carries the RTS information; or
   when the initiating node is the terminal device and the responding node is the network device, the RTS information is sent through the second PUCCH; and the CTS information is received through the second PDCCH, third DCI carried by the second PDCCH carries third indication information, and the third indication information is used to indicate that the second PDCCH carries the CTS information.

7. The method according to claim 6, wherein
when the second Downlink Control Information (DCD) carried by the first PDCCH carries the second indication information, and the second indication information is used to indicate that the first PDCCH carries the RTS information, the second indication information is indicated by a newly defined indication field in the second DCI, or the second indication information is determined based on specific values or a combination of specific values of multiple fields in the second DCI; or
when the third DCI carried by the second PDCCH carries the third indication information, and the third indication information is used to indicate that the second PDCCH carries the CTS information, the third indication information is indicated by a newly defined indication field in the third DCI, or the third indication information is determined based on specific values or a combination of specific values of multiple fields in the third DCI.

8. The method according to claim 1, wherein
when the initiating node is a network device and the responding node is a terminal device, the RTS information and the CTS information are transmitted through a first channel;
when the initiating node is a terminal device and the responding node is a network device, the RTS information and the CTS information are transmitted through a second channel; or
when the initiating node and the responding node are both terminal devices, the RTS information is sent through a Physical Sidelink Control CHannel (PSCCH), and the CTS information is received through the PSCCH.

9. The method according to claim 1, wherein
the RTS information is sent through a first message, and the first message comprises a Medium Access Control (MAC) Control Element (CE) or a MAC Protocol Data Unit (PDU); or
the CTS information is received through a second message, and the second message comprises a MAC CE or a MAC PDU;
wherein
the first message further comprises a first preamble sequence, and the first preamble sequence is used to indicate that the first message carries the RTS information; or
the second message further comprises a second preamble sequence, and the second preamble sequence is used to indicate that the second message carries the CTS information.

10. The method according to claim 9, further comprising:
determining, based on a format of the first preamble sequence, that the first message carries the RTS information, wherein the format of the first preamble sequence is predefined or configured; or
determining, based on a format of the second preamble sequence, that the second message carries the CTS information, wherein the format of the second preamble sequence is predefined or configured; or
determining, according to a time-frequency resource position of the first preamble sequence, that the first message carries the RTS information; or
determining, according to a time-frequency resource position of the second preamble sequence, that the second message carries the CTS information.

11. The method according to claim 9, further comprising:
determining, according to load information of a fixed position of the first message or DeModulation Reference Signal (DM-RS) information of the first message, that the first message carries the RTS information; or
determining, according to load information of a fixed position of the second message or DM-RS information of the second message, that the second message carries the CTS information.

12. An information transmission method, performed by a responding node, comprising:
receiving Request To Send (RTS) information from an initiating node; and
when the RTS information comprises identifier information of the responding node, sending Confirm To Send (CTS) information,
wherein the RTS information and the CTS information are transmitted through a third channel;
wherein the third channel is detectable by the initiating node and the responding node;
wherein
a time domain location of the RTS information is predefined; or
a time domain location of the CTS information is predefined.

13. The method according to claim 12, wherein
when the initiating node is a network device and the responding node is a terminal device, the RTS information is received through a first Physical Downlink Control CHannel (PDCCH); and the CTS information is sent through a first Physical Uplink Control CHannel (PUCCH); or
when the initiating node is a terminal device and the responding node is a network device, the RTS information is received through a second PUCCH; and the CTS information is sent through a second PDCCH.

14. The method according to claim 13, wherein
the first PDCCH is scrambled by a first Radio Network Temporary Identifier (RNTI), and the first RNTI is used to indicate that the first PDCCH carries the RTS information;
the second PDCCH is scrambled by a second RNTI, and the second RNTI is used to indicate that the second PDCCH carries the CTS information; or
both the first PDCCH and the second PDCCH are scrambled by a third RNTI, the first PDCCH and the second PDCCH are the same PDCCH, and the third RNTI is used to indicate that the same PDCCH carries the RTS information or the CTS information.

15. The method according to claim 14, wherein
when the initiating node is a network device and the responding node is a terminal device, the RTS information and the CTS information are transmitted through a first channel; or
when the initiating node is a terminal device and the responding node is a network device, the RTS information and the CTS information are transmitted through a second channel; or
when the initiating node and the responding node are both terminal devices, the RTS information is received through a Physical Sidelink Control CHannel (PSCCH); and the CTS information is sent through the PSCCH.

16. The method according to claim 14, wherein
the RTS information is received through a first message, and the first message comprises a Medium Access Control (MAC) Control Element (CE) or a MAC Protocol Data Unit (PDU); or the CTS information is sent through a second message, and the second message comprises a MAC CE or a MAC PDU;

wherein the first message further comprises a first preamble sequence, and the first preamble sequence is used to indicate that the first message carries the RTS information; or the second message further comprises a second preamble sequence, and the second preamble sequence is used to indicate that the second message carries the CTS information.

17. A communications device, comprising:

a memory storing computer-readable instructions; and a processor coupled to the memory and configured to execute the computer-readable instructions, wherein the computer-readable instructions, when the processor, cause the processor to perform operations comprising:

sending Request To Send (RTS) information, wherein the RTS information comprises identifier information of a responding node; and receiving Confirm To Send (CTS) information from the responding node, wherein the RTS information and the CTS information are transmitted through a third channel;

wherein the third channel is detectable by the initiating node and the responding node:

wherein a time domain location of the RTS information is predefined; or a time domain location of the CTS information is predefined.

18. A communications device, comprising:

a memory, a processor and an instruction or a program stored in the memory and executable on the processor, wherein when the instruction or program is executed by the processor, the information transmission method according to claim 12 are implemented.

* * * * *